United States Patent Office.

BUTLER G. NOBLE, OF NEW YORK, N. Y.

Letters Patent No. 66,732, dated July 16, 1867.

---

IMPROVED ARTICLE OF FOOD FROM OYSTER JUICE.

---

The Schedule referred to in these Letters Patent and making part of the same.

---

TO ALL WHOM IT MAY CONCERN

Be it known that I, BUTLER G. NOBLE, of the city and county of New York, and State of New York, have invented a new and useful Article of Manufacture for Purposes of Food; and I do hereby declare that the following is a full and exact description of the mode of producing the same.

The nature of my invention consists in concentrating, by evaporation, the juice or natural liquor of the oyster, to a state of dryness, thus producing a cheap and nutritious article of food, which I denominate "extract of oyster."

To enable others skilled in the art to make and use my invention, I will proceed to describe the mode of producing the same.

In this country, during cold weather, oysters are put up raw, in tin cans and in wooden kegs, and sent to points distant from the sea board. For this purpose they are removed from the shell, and all the juice or natural liquor of the oyster is drained off and thrown away. The oysters are then thoroughly rinsed previous to packing. This is deemed a prerequisite to their proper preservation.

I take this fresh juice or natural exudation of the oyster, which is regarded as a waste material, and by means of any of the ordinary modes of evaporation, at a low temperature, concentrate it to the consistency of a thick jelly. This jelly is placed in shallow pans, and exposed in warm chambers until the mass is reduced to comparative dryness. In this state it may be cut or pressed into cakes, tablets, or any form desired.

In this form the "extract of oyster," if kept dry, will remain unchanged for a long time. Its purity and nutritive qualities adapt it particularly to the use of hospitals and invalids, while the small space which it occupies commends it to persons making long voyages or overland journeys. A tablet or cake weighing two ounces contains the nutritive value of four quarts of fresh oyster juice, and will produce, with the addition of a proper amount of boiling water, four quarts of strong oyster soup, retaining the natural flavor of the oyster.

I do not confine myself to any particular form of apparatus for the evaporation herein mentioned, as there are numerous appliances for such purposes. An obvious mode of operating would be the employment of shallow pans, placed in a water bath, or surrounded by steam space, to prevent burning. In like manner concentration in vacuum-pans might be practicable, and attended with advantage. The chief object is to effect the evaporation at as low a temperature as practicable, to the end that the natural flavor of the oyster may remain unchanged.

I am aware that oysters have been dried whole, and also that attempts have been made to produce desiccated oysters by chopping them up and drying the mass. I make no claim to this, nor to any analogous product, as my invention does not involve the use of the solid portions of the oyster.

What I claim as my invention, and desire to secure by Letters Patent, is—

The extract of oyster as a new article of manufacture, the same being the natural juice or liquor of the oyster, concentrated by evaporation to a state of dryness, substantially as and for the purposes herein set forth.

BUTLER G. NOBLE.

Witnesses:
  EDGAR ROGERS,
  C. WHITING, Jr.